(No Model.)
J. CASHIN.
MITER BOX.
No. 297,970.
Patented May 6, 1884.
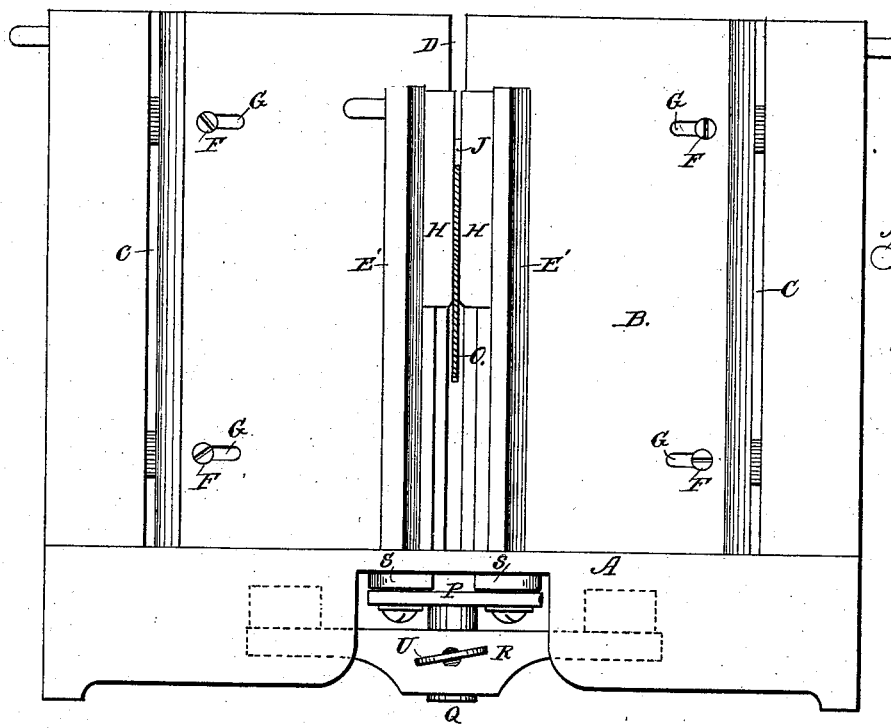
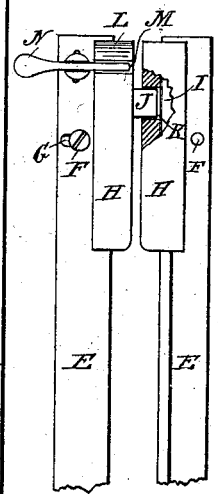
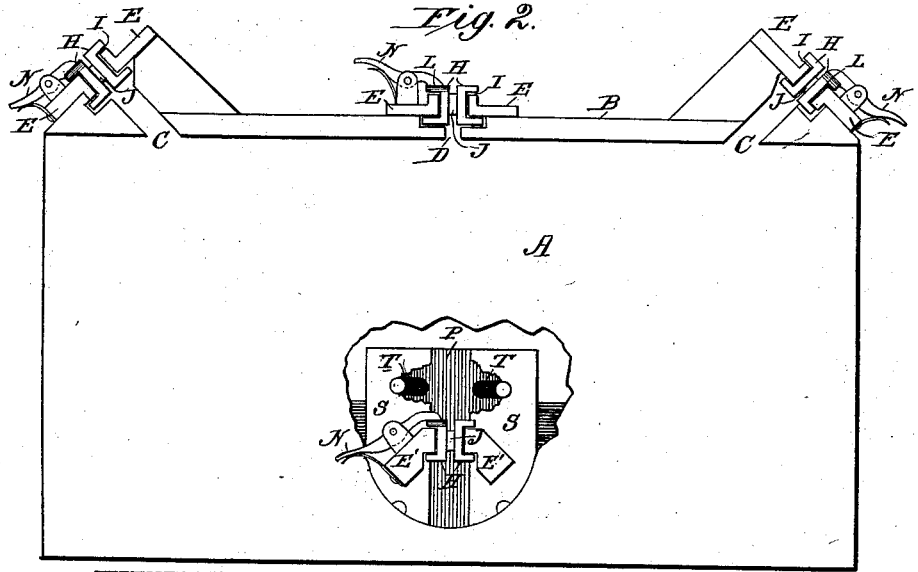
WITNESSES:
W. W. Hollingsworth
A. G. Lyne
INVENTOR:
Joseph Cashin
BY Munn & Co.
ATTORNEYS.

UNITED STATES PATENT OFFICE.

JOSEPH CASHIN, OF WASHINGTON, DISTRICT OF COLUMBIA.

MITER-BOX.

SPECIFICATION forming part of Letters Patent No. 297,970, dated May 6, 1884.

Application filed December 22, 1883. (No model.)

*To all whom it may concern:*

Be it known that I, JOSEPH CASHIN, of Washington, in the District of Columbia, have invented a new and useful Improvement in Miter-Boxes, of which the following is a full, clear, and exact description, reference being had to the annexed drawings, forming part of this specification.

The object of my invention is to provide a miter-box with which a handsaw, without the addition of an extra back, may be used for cutting any depth desired; and the invention consists of the novel construction hereinafter described and claimed.

In the drawings, Figure 1 is an elevation of my miter-box. Fig. 2 is a top plan view of the same, partly broken away; and Fig. 3 is a detail view.

A indicates the base of the box, and B is a side plate attached to one edge of the base, and having vertical slots C C D. To this plate, at opposite sides of the slots, are attached vertical guide-bars E, which are secured by bolts or screws F, inserted in transverse slots G, to allow the bars to be adjusted toward or from each other.

Between each pair of bars E are arranged a pair of slides, H, having grooves I, by which they are held in engagement with the said bars as they slide up and down the same. The slides H are connected together by a projection, J, on the face of one, which fits in an opening, K, in the face of the other. One of the slides H is provided with a bevel end, L, and a notch, M, with the latter of which a spring-catch, N, attached to the upper end of one of the bars E, is adapted to engage, to hold the slides at the upper ends of the slots preparatory to placing a saw, O, in engagement with the slides.

In the base A is supported a pair of guide-bars, E', which are attached to a plate, P, having a pintle, Q, which is adapted to rotate in a bracket, R, or other support under or in the base A. The lower ends of the bars E' are provided with flanges S, by which they are bolted to the plate P, and the said plate is provided with slots T for the bolts, to allow the bars E' to be adjusted toward or from each other. A screw, U, passing into the bracket R and bearing against the pintle Q, serves to prevent the latter from rotating too freely. The guide-bars E' are likewise provided with a pair of slides, H, formed as above described.

The operation of the invention is as follows: An ordinary handsaw, O, without the extra back which is commonly used in mitering, is placed between the slides of the bars E' and those of one of the slots C C D, and may be moved up until its thin back rests against the projections J. Then, by releasing the catches N of said slides, the slides will be supported on the saw by the projections J, and will follow the saw down in the operation of sawing. The guide-bars E' may be turned to allow the saw to be placed in any one of the slots C C D, the slots C C being for a miter and the slot D for a square cut. With this construction the saw may be made to cut any desired depth, and the device may be adjusted to any thickness of saw. The guide-bars being adjustable and capable of being held perfectly rigid, a true miter or square cut can be easily secured.

What I claim is—

1. The slides H, having plane faces from end to end, between which a saw may be placed, and provided with a connection by which they may be supported on the back of a saw, consisting of a projection, J, on the face of one slide, and an opening, K, in the face of the other, adapted to receive the end of said projection, substantially as shown and described.

2. The combination of the bars E, the connected slides H, one having the recess M and bevel L, and the catch N, supported in one of said bars, substantially as shown and described.

3. The combination of the revoluble guide-bars E', adapted to turn together, and the series of bars E, having slots C C D, with any one of which slots the slot in said bars E' may be made to register, substantially as shown and described, and for the purpose set forth.

4. The combination of the base A, the guide-bars E', having a common pintle at their lower ends, the supporting-bracket, and the set-screw bearing against the said pintle, substantially as shown and described.

JOSEPH CASHIN.

Witnesses:
A. G. LYNE,
SOLON C. KEMON.